United States Patent
Hervieu et al.

(10) Patent No.: US 9,658,467 B2
(45) Date of Patent: May 23, 2017

(54) OPHTHALMIC LENS THAT CAN BE EDGED, COMPRISING A HYDROPHOBIC BILAYER AND A TEMPORARY METAL FLUORIDE LAYER

(71) Applicant: ESSILOR INTERNATIONAL (COMPAGNIE GENERALE D'OPTIQUE), Charenton le Pont (FR)

(72) Inventors: Gregory Hervieu, Charenton-le-Pont (FR); Christophe Valenti, Charenton-le-Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 19 days.

(21) Appl. No.: 14/655,904

(22) PCT Filed: Dec. 16, 2013

(86) PCT No.: PCT/FR2013/053104
§ 371 (c)(1),
(2) Date: Jun. 26, 2015

(87) PCT Pub. No.: WO2014/102481
PCT Pub. Date: Jul. 3, 2014

(65) Prior Publication Data
US 2015/0338679 A1    Nov. 26, 2015

(30) Foreign Application Priority Data
Dec. 28, 2012 (FR) .................................. 12 62953

(51) Int. Cl.
G02B 1/12    (2006.01)
G02C 7/02    (2006.01)
G02B 1/18    (2015.01)
G02B 1/04    (2006.01)

(52) U.S. Cl.
CPC .............. G02C 7/022 (2013.01); G02B 1/12 (2013.01); G02B 1/18 (2015.01); G02B 1/041 (2013.01); G02C 2202/16 (2013.01); Y10T 156/1111 (2015.01)

(58) Field of Classification Search
None
See application file for complete search history.

(56) References Cited

U.S. PATENT DOCUMENTS

| | | | |
|---|---|---|---|
| 6,183,872 B1* | 2/2001 | Tanaka | C08G 65/007 106/287.13 |
| 6,991,827 B2* | 1/2006 | Biver | B29D 11/00865 118/423 |
| 2004/0253369 A1* | 12/2004 | Jallouli | B05D 3/141 427/162 |
| 2005/0115923 A1* | 6/2005 | Lacan | C03C 17/3417 216/26 |
| 2005/0168685 A1* | 8/2005 | Katagiri | C09D 4/00 351/159.01 |
| 2006/0246278 A1* | 11/2006 | Lacan | B24B 9/144 428/336 |
| 2007/0104891 A1* | 5/2007 | Fournand | C09D 5/1662 427/561 |
| 2007/0141358 A1* | 6/2007 | Jallouli | B24B 9/146 428/426 |
| 2007/0183056 A1* | 8/2007 | Conte | B24B 9/146 359/642 |
| 2008/0117382 A1* | 5/2008 | Lacan | B24B 1/00 351/159.57 |
| 2008/0271844 A1* | 11/2008 | Lacan | C03C 17/00 156/278 |
| 2010/0053547 A1 | 3/2010 | Baude et al. | |
| 2010/0247890 A1 | 9/2010 | Hbassi et al. | |
| 2010/0279089 A1* | 11/2010 | Naito | C09D 175/06 428/212 |
| 2010/0310874 A1 | 12/2010 | Acheritobehere et al. | |
| 2011/0223418 A1 | 9/2011 | Habassi | |
| 2012/0262790 A1 | 10/2012 | Su et al. | |
| 2012/0272800 A1 | 11/2012 | Lacan et al. | |

FOREIGN PATENT DOCUMENTS

| | | |
|---|---|---|
| EP | 1392613 A1 | 3/2004 |
| FR | 2907915 A1 | 5/2008 |
| FR | 2921162 A1 | 3/2009 |
| FR | 2924233 A1 | 5/2009 |
| FR | 2938255 A1 | 5/2010 |
| WO | 02092524 A1 | 11/2002 |
| WO | 2004110946 A1 | 12/2004 |
| WO | 2008053020 A1 | 5/2008 |

OTHER PUBLICATIONS

International Search Report, dated Mar. 27, 2014, from corresponding PCT application.

* cited by examiner

Primary Examiner — Robert S Loewe
(74) Attorney, Agent, or Firm — Young & Thompson

(57) ABSTRACT

An ophthalmic lens that can be edged, includes a main front surface and a main rear surface, obtained by successive deposition on at least one of the main surfaces of the lens, of a first hydrophobic layer that has a thickness of between 6 and 16 nm and is obtained by deposition of a composition including a constituent A selected from fluorosilanes having a number average molar mass that is higher than, or equal to, 2000 g/mol, of a second hydrophobic layer that has a thickness of between 3 and 20 nm and is obtained by the deposition of a composition including a constituent B selected from the fluorosilanes having a number average molar mass than is lower than, or equal to, 900 g/mol, and of a layer including a metal fluoride having a thickness of between 22 and 50 nm.

17 Claims, No Drawings

OPHTHALMIC LENS THAT CAN BE EDGED, COMPRISING A HYDROPHOBIC BILAYER AND A TEMPORARY METAL FLUORIDE LAYER

BACKGROUND OF THE INVENTION

Field of the Invention

The present invention relates to an ophthalmic lens, for a pair of spectacles, comprising an antifouling coating and a temporary top-coat deposited beforehand on the antifouling coating, the temporary top-coat making the lens fit for edging and leading, after it has been removed, to an ophthalmic lens having improved antifouling properties relative to ophthalmic lenses obtained from ophthalmic lenses comprising a conventional temporary top-coat.

Description of the Related Art

A lens results from a succession of molding and/or surfacing/polishing operations, which define the geometry of the two (convex and concave) surfaces of said lens, and then appropriate surface treatments.

The edging operation, which consists in machining the edge face or periphery of a lens so as to give this lens the dimensions required to fit it in the spectacle frame into which it is intended to be placed, is the last of the finishing steps carried out on the ophthalmic lens.

The edging is generally carried out with a mill comprising diamond wheels and/or cutting heads that perform the machining such as defined above.

The lens is held, during this operation, by axially acting blocking members.

The relative movement of the lens, with respect to the wheel, is controlled, generally digitally, in order to produce the desired shape.

As will be apparent, it is absolutely essential for the lens to be firmly held during this movement.

To do this, before the edging operation, the lens is blocked, i.e. a holding means or block is positioned on the convex surface of the lens.

A blocking pad, possibly a self-adhesive pad, for example comprising a double-sided pressure-sensitive adhesive (PSA), is placed between the block and the convex and/or concave surface (preferably the convex surface) of the lens—the latter case will be described in more detail in the remainder of the present application.

The lens thus equipped is positioned on one of the aforementioned axial blocking members, the second axial blocking member then chucking the lens on its concave face via a stop that is generally made of an elastomer. During machining, a tangential torque is applied to the lens, this possibly causing the lens to rotate with respect to the block if the system for holding the lens.

Whether the lens is held correctly mainly depends on whether there is a good bond at the interface between the holding pad and the convex surface of the lens.

Antifouling coatings, also referred to as "hydrophobic and/or oleophobic coatings" are well known in the art. They are generally manufactured from fluorosilanes or fluorosilazanes, i.e. silanes or silazanes containing fluorine atoms.

The highest performance antifouling coatings possess low surface energies, typically surface energies lower than or equal to 14 $mJ/m^2$ and preferably lower than or equal to 12 $mJ/m^2$.

The consequence of these low surface energies is that the lens may slip off axis during the edging step.

This technical problem is known.

In order to remedy it, it has been proposed to deposit temporary coatings (or temporary top-coats) that allow slip during the edging to be prevented while preserving the properties of the antifouling coating.

Such techniques have been the subject matter of many patents such as patents EP 1 392 613, WO 2004/110946 and WO 2008/053020.

After the top-coat has been removed, the properties of the hydrophobic layer may, even if they are well preserved on the whole, sometimes be worse than those of the layer before deposition of the temporary layer. In particular, contact angle may be smaller by a few degrees, relative to that of the hydrophobic layer before deposition of the temporary layer.

Moreover, durability (how long the coating keeps its hydrophobic properties under the effect of repeated wiping) may be affected.

SUMMARY OF THE INVENTION

It is one of the aims of the invention to provide an ophthalmic lens, for a pair of spectacles, comprising an antifouling coating and a temporary top-coat deposited beforehand on the antifouling coating, the temporary top-coat making the lens fit for edging and leading, after it has been removed, to an ophthalmic lens having improved antifouling properties relative to ophthalmic lenses comprising a hydrophobic layer and a conventional top-coat such as a metal fluoride top-coat.

Of course, this improvement must be obtained without adversely affecting the other properties of the top-coat, namely its ability to make the ophthalmic lens fit for edging and to be easily removed, in particular by dry wiping, by means of a simple lens cleaning cloth and/or in the presence of an appropriate solvent (alcohol). According to the invention, by depositing two specific hydrophobic layers in succession before depositing the temporary, metal fluoride top-coat, and by using precisely defined thicknesses for these hydrophobic layers and for the temporary top-coat, the contact-angle and durability properties of the hydrophobic layer, after the top-coat has been removed, are substantially improved relative to hydrophobic lenses of the prior art using a conventional hydrophobic layer and top-coat.

Thus, the invention consists of an ophthalmic lens fit for edging, comprising a front main face and a back main face, obtained by depositing in succession in this order on at least one of the main faces of the lens and preferably the front main face:

at least one first hydrophobic layer, of a physical thickness of 6 to 16 nm, obtained by depositing a composition comprising a first constituent A chosen from fluorinated compounds, and preferably perfluorinated compounds, and even more preferably perfluorinated polyethers, containing at least one silanol group or a silanol-group precursor, and the number average molar mass of which is higher than or equal to 2000 g/mol and preferably from 2000 to 10000 g/mol;

at least one second hydrophobic layer, of a physical thickness from 3 to 20 nm, obtained by depositing a composition comprising a second constituent B chosen from fluorinated compounds and preferably perfluorinated compounds containing at least one silanol group or a precursor thereof and the number average molar mass of which is lower than or equal to 900 g/mol;

at least one temporary layer comprising a metal fluoride of a physical thickness of 22 to 50 nm; and optionally a temporary layer comprising a metalloid or metal hydroxide or oxide.

DETAILED DESCRIPTION OF THE INVENTION

In the present application, a temporary coating is a coating intended to be removed/withdrawn after the edging of the ophthalmic lens.

The "back face" of the substrate (the back face generally being concave) is understood to be the face that, when the article is being used, is closest to the eye of the wearer. Conversely, the "front face" of the substrate (the front face generally being convex) is understood to be the face that, when the article is being used, is furthest from the eye of the wearer.

The inventors have observed that the physical thicknesses of the first hydrophobic layer and the metal fluoride layer are the parameters that have the most influence on the final performance of the antifouling layer.

Nonetheless, thicknesses from 3 to 10 nm and better still from 5 to 8 nm are particularly recommended for the second hydrophobic layer.

Whether singly or in combination, preferred nonlimiting features of ophthalmic lenses according to the invention are as follows:
  the preferred physical thickness of the first hydrophobic layer is from 6 to 15 nm, and the physical thickness of the layer comprising a metal fluoride is from 24 to 40 nm;
  the physical thickness of the first hydrophobic layer is from 8 to 12 nm, and the physical thickness of the layer comprising a metal fluoride is from 25 to 38 nm;
  the physical thickness of the first hydrophobic layer is from 6 to 15 nm, and the physical thickness of said layer comprising a metal fluoride is from 24 to 40 nm;
  the physical thickness of the first hydrophobic layer is from 8 to 12 nm and better still from 8 to 11 nm, the physical thickness of the second hydrophobic layer is from 5 to 8 nm, and the physical thickness of the layer comprising a metal fluoride is from 25 to 38 nm and better still from 28 to 33 nm;
  the total thickness of the first and second hydrophobic layers is larger than or equal to 13 nm;
  the total thickness of the first and second hydrophobic layers is larger than or equal to 15 nm when the thickness of the layer comprising a metal fluoride is larger than or equal to 40 nm; and
  a magnesium oxide layer is deposited on the metal fluoride layer.

The compounds A and B are chosen so as to give the first and second layers hydrophobic properties.

A layer that is said to have hydrophobic properties (i.e. a hydrophobic layer) is understood to be a layer the surface of which has a static contact angle with water of 90° or more.

The compound A is preferably chosen from compounds leading to a first layer possessing a surface energy lower than or equal to 14 mJ/m² and better still lower than or equal to 12 mJ/m².

The first hydrophobic layer is obtained by depositing a composition preferably comprising at least 40 wt %, better still 50 wt %, better still at least 70 wt % and optimally at least 80 wt % of compound A.

The surface energies are calculated using the Owens-Wendt method described in the article: "Estimation of the surface force energy of polymers" Owens D. K., Wendt R. G. (1969), J. APPL-POLYM-SCI, 13, 1741-1747.

The static contact angle with water of the first hydrophobic layer is preferably larger than 100°, better still larger than 110° and even better still larger than 115°.

The constituent A is chosen from fluorinated compounds and preferably perfluorinated compounds comprising at least one silanol group or silanol-group precursor, and the number average molar mass of which is higher than or equal to 2000 g/mol, preferably from 2000 to 10,000 g/mol, better still from 3000 to 6000 g/mol and optimally from 3000 to 5000 g/mol.

Generally, in the present application, both for the constituent A and the constituent B, the precursor groups of silanol groups may be represented independently of one another by the hydrolysable group of formula —Si(X)$_n$, where n is an integer varying from 1 to 3 and where the groups X independently represent precursor groups of hydroxyl groups, i.e. of hydrolysable groups.

Preferably, X is an alkoxy group, an $NH_2$ group or a chlorine atom, and preferably is an ethoxy or methoxy group.

Preferably, only one chain end of the compound A comprises a silanol group or a silanol-group precursor.

Preferably, the constituent A comprises at least one compound chosen from compounds of formula:

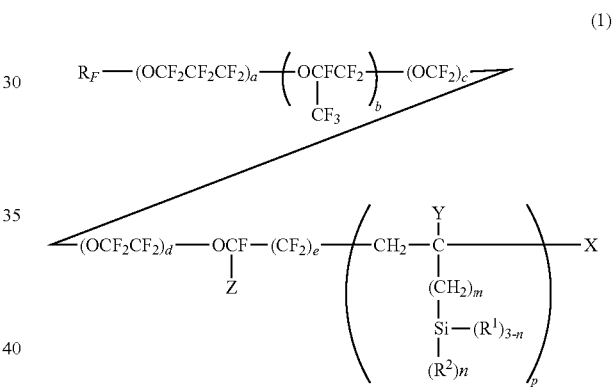

(1)

in which
  $R_F$ represents a straight or branched perfluoroalkyl chain group containing 1 to 16 carbon atoms;
  X is a hydrogen, bromine or iodine atom;
  Y is a hydrogen atom or a linear or branched alkyl group containing 1 to 6 carbon atoms;
  Z is a fluorine atom or a trifluoromethyl group;
  $R^1$ is a hydrolysable group;
  $R^2$ is a hydrogen atom or an inactive monovalent group;
  a, b, c and d are integers from 0 to 200;
  e is 0 or 1;
  m and n are integers from 0 to 2; and
  p is an integer from 1 to 10.
  Rf, a, b, c, e, m, n and p are chosen so that the average molar mass of the compound of formula (1) is higher than or equal to 2000.

Preferably, the first hydrophobic layer is obtained by depositing a composition comprising from 35 to 60 wt % of a compound of formula (1) and better still 40 to 55 wt % of a compound of formula (1).

Better still, the constituent (1) is preferably chosen from compounds of formula:

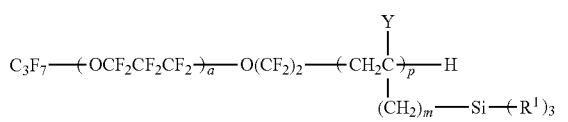

(1')

in which
Y is a hydrogen atom or an alkyl radical containing 1 to 6 carbon atoms;
$R^1$ is a hydrolysable group;
a is an integer from 10 to 50;
m is an integer from 0 to 2; and
p is an integer from 1 to 10.

The particularly preferred constituent A comprises Optool DSX™ from Daikin or AES 4 from the same company.

The constituent B is chosen from fluorinated compounds and preferably perfluorinated compounds comprising at least one silanol group or precursor thereof, and the number average molar mass of which is lower than or equal to 900 and preferably from 300 to 800 and better still from 400 to 600.

When it is deposited in the form of a monolayer of 5 nm on a silica ($SiO_2$) surface, the constituent B generally leads to a layer possessing a surface energy lower than or equal to 16 mJ/m$^2$, better still lower than or equal to 15 mJ/m$^2$ and even better still lower than or equal to 14 mJ/m$^2$ being obtained.

The constituent B is generally less hydrophobic than the constituent A, i.e. the static contact angle with water of a monolayer obtained from constituent A is lower than that of a monolayer obtained from constituent B.

Preferably, only one chain end of the compound B comprises a silanol group or a silanol-group precursor.

A preferred constituent B comprises a silazane compound of formula

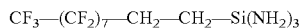

This compound is available under the trade name OF110™ from the company Optron.

Another usable constituent B is the compound OF210™ from the same company.

The first and second hydrophobic layers may be formed by any well-known technique such as dip coating, spin coating, spray coating and evaporation. Preferably, the hydrophobic layers are formed by vacuum evaporation. Preferably, the temporary layers are also formed by vacuum evaporation.

In these deposition operations, the constituents A and B may be used as is or diluted with an appropriate solvent, or even incorporated into a fibrous or porous material.

Among the solvents suitable for diluting the constituents A and B, mention may be made of fluoro-modified aliphatic hydrocarbons (e.g.: perfluoroheptane and perfluorooctane), fluoro-modified aromatic hydrocarbons (e.g.: xylene hexafluoride and benzene trifluoride), fluoro-modified ethers (e.g.: methylperfluorobutylether and perfluoro(butyl)-2-tetrahydrofurane), fluoro-modified alkylamines (e.g.: perfluorotributylamine and perfluorotripentylamine), hydrocarbons (e.g. petroleum benzene, mineral spirits, toluene and xylene) and ketones (e.g.: acetone, methylethylketone and methylisobutylketone).

The temporary layer is a layer comprising a metal fluoride or a mixture of metal fluorides.

By way of example of metal fluorides, mention may be made of magnesium fluoride $MgF_2$, lanthanum fluoride $LaF_3$, aluminum fluoride $AlF_3$ or cerium fluoride $CeF_3$. Magnesium fluoride will preferably be used.

As indicated above, the thickness of the first layer of metal fluoride ranges from 22 to 50 nm, better still from 24 to 40 nm and even better still from 25 to 38 nm.

An optional metal oxide and/or metal hydroxide layer may be deposited on the lens according to the invention.

The MgO layer may result from evaporation of:
granules of MgO with a grain size of 1 to 3 nm (ref: M-1131 from CERAC);
granules of MgO with a grain size of 3 to 6 nm (ref: M-2013 from UMICORE); and
grains of MgO (ref: 0481263, sold by UMICORE).
$Mg(OH)_2$ from ALDRICH may be deposited.

The metal oxide and/or metalloid or metal hydroxide layer is generally small in thickness, generally thinner than 10 nm and preferably from 1 to 5 nm in thickness.

In one preferred embodiment of the invention, the ophthalmic lens comprises an antireflection coating interposed between the main surface of the substrate and the layers according to the invention, the first hydrophobic layer being deposited directly on the external surface of the antireflection coating. Again preferably, the external surface of the antireflection coating is the external surface of a silicon oxide layer, preferably a layer of $SiO_2$ or a layer containing $SiO_2$.

In another preferred embodiment, the optical article comprises an antiabrasion and/or antiscratch coating below the antireflection coating, and optionally an antishock primer coating between the antiabrasion and/or antiscratch coating and the substrate. In the present application, the expression "optically transparent substrate" encompasses any substrate conventionally used in the field of ophthalmic optics, whether this substrate is bare or coated with one or more conventional functional coatings other than an antifouling coating. What is meant when the external surface of a coating or of a layer is referred to is the surface of the coating or layer furthest from the main surface of the substrate. Generally, the substrate of the optical article according to the invention may be any substrate, but it is preferably a substrate made of an organic glass, a thermoplastic or thermoset for example.

Regarding thermoplastics suitable for the substrate, mention may be made of (meth)acrylic (co)polymers, in particular polymethyl methacrylate (PMMA), thio(meth)acrylic (co)polymers, polyvinyl butyral (PVB), polycarbonates (PC), polyurethanes (PU), polythiourethanes, polyol(allyl carbonate) (co)polymers, thermoplastic ethylene/vinyl acetate copolymers, polyesters such as polyethylene terephthalate (PET) or polybutylene terephthalate (PBT), polyepisulfides, polyepoxides, polycarbonate/polyester copolymers, cyclic olefin copolymers such as ethylene/norbornene or ethylene/cyclopentadiene copolymers and their blends.

The term "(co)polymer" is understood to mean a copolymer or a polymer. The term "(meth)acrylate" is understood to mean an acrylate or a methacrylate.

As regards preferred substrates according to the invention, mention may be made of substrates obtained by polymerizing alkyl methacrylates, particularly $C_1$-$C_4$ alkyl methacrylates such as methyl methacrylate and ethyl methacrylate, polyethoxylated aromatic methacrylates such as polyethoxylated bisphenol dimethacrylates, allyl derivatives such as linear or branched aliphatic or aromatic polyol allylcarbonates, thiomethacrylates, episulfides, and polythiol/polyisocyanate precursor mixtures (for obtaining polythiourethanes).

The term "polycarbonate (PC)" is understood in the context of the present invention to mean both homopolycarbonates and copolycarbonates and sequenced copolycarbonates. Polycarbonates are commercially available, for example from GENERAL ELECTRIC COMPANY under the trade name LEXAN®, from TEIJIN under the trade name PANLITE®, from BAYER under the trade name BAYBLEND®, from MOBAY CHEMICAL Corp. under the trade name MAKROLON®, and from DOW CHEMICAL Co. under the trade name CALIBRE®.

After the ophthalmic lens has been edged, the temporary top-coat and the optional temporary metalloid or metal hydroxide and/or oxide layer may be removed by any appropriate means, for example in a liquid medium and/or by mechanical action, preferably by dry wiping by means of a simple lens cleaning cloth and/or in the presence of an appropriate solvent (alcohol).

The invention also relates to the ophthalmic lenses obtained after removal of the metal fluoride lay and, when it is present, the layer comprising a metalloied or metal hydroxide and/or oxide, these lenses preferably having a static contact angle with water of 117° or more.

The following examples illustrate the present invention nonlimitingly. In the examples, unless otherwise indicated, all the percentages and proportions are expressed by weight. The thicknesses, especially the hydrophobic-layer thicknesses, are physical thicknesses.

EXAMPLES

The deposition was carried out in a BAK760 vacuum deposition machine from the company Balzers, said machine being equipped with an ion gun, an electron gun and a resistively heated thermal evaporator.

The ophthalmic lenses were Orma® lenses having a power of −2.00 diopters and a thickness of 2.1 mm at their center.

Each ophthalmic lens comprised an antiabrasion coating such as described in example 3 of patent EP 614 957, and a $ZrO_2/SiO_2/ZrO_2/ITO$ (indium tin oxide)/$SiO_2$ multilayer antireflection coating.

In the general procedures described below, a layer of Optool DSX™ (supplier: Daikin) was deposited directly on the last silica layer of the antireflection coating, then a layer of OF210™ (supplier: Optron) was deposited, and then the layers of $MgF_2$ and MgO were deposited under secondary vacuum (<$10^{-3}$ mbar).

1. Deposition of the First Hydrophobic Layer (DSX™ Coat).

The DSX™, placed in a copper boat, was evaporated by resistive heating. The deposition was carried out at a deposition rate lower than 0.33 nm/s.

2. Deposition of the Second Hydrophobic Layer (OF210™).

This layer was deposited by evaporation using the electron gun.

A copper boat containing steel wool impregnated with OF210® supplied by Optron was used. The OF210™ boat was placed in a cavity of the crucible. A pierced cover obtained from the company Satis was placed on this boat. The cover, which was heated by the electron flux, itself heated the copper boat via thermal conduction. The temperature within the "oven" thus created increased until the OF210 evaporated.

The deposition rate was lower than 0.2 nm/s.

3. Deposition of the $MgF_2$ and MgO Layers:

These materials were evaporated by the electron gun.

3.1—Deposition of the $MgF_2$ layer:

The evaporating material was a compound of formula $MgF_2$, of 1-2.5 nm grain size, sold by MERCK. For the $MgF_2$, the deposition rate was adjusted to about 0.75 nm/s.

3.2—The MgO was then deposited by evaporation directly on the $MgF_{2\ layer}$.

A 2 nm-thick MgO layer was vacuum evaporated (from MgO pellets (reference 0481263) from UMICORE) directly on the $MgF_2$ layer using the electron gun.

Lenses were fabricated using the general process such as described above, the thicknesses of Optool DSX™, of OF210™ and of $MgF_2$ being varied (the thickness of MgO remaining constant at 2 nm).

Lenses corresponding to comparative examples, with thicknesses different from that of the present invention, were also manufactured, and lenses without a second hydrophobic layer (without OF210™), by way of example of the prior art.

These lenses were then subjected to deblocking tests, top-coat removal tests and contact angle measurement tests.

All the results obtained are collated in table 2.

Measurement of the Thicknesses of the Deposited Layers.

The values of the thicknesses programmed into the evaporation device were different to those actually deposited. Therefore, the evaporation conditions that needed to be applied to deposit the physical thicknesses required for the hydrophobic monolayers, the metal fluoride monolayers and the metalloid or metal hydroxide or oxide monolayers were determined. The thicknesses were measured using an ellipsometer.

Technique using a Woollam VB-400 VASE Spectro-Ellipsometer

The technique is described for a hydrophobic layer, but applies to any layer of small thickness and preferably of thickness smaller than or equal to 25-30 nm and better still (<~10-15 nm).

The hydrophobic monolayer was deposited on a silicon disc that had undergone an ion pre-cleaning (IPC) treatment (60 seconds 1A—100V).

The thicknesses deposited on the silicon discs were measured.

The index of the hydrophobic layers was about 1.36.

The layers were assumed to have been deposited on a native $SiO_2$ oxide of 2 nm and a Cauchy model was used for the refractive index of the layer: $n=a+b/\lambda+c/\lambda^2$, for a wavelength $\lambda$. Typically, a=1.36; b=0.003 and c=0 for the hydrophobic fluorinated layers. The method then consisted in measuring $\Psi$ and $\Delta$ at an incidence of 75° between 300 and 800 nm and in computationally adjusting the values (angle of incidence and thickness of the layer) to obtain a good fit (the best superposition of the curves) between the theoretical simulation and the actual measurement of the sample using tan ($\Psi$) and cos ($\Delta$). The thickness measurement was confirmed if the value of the angle obtained during the adjustment was close to 75° (75°+/−0.5°).

To use this method to measure the thickness of other layers, and in particular of the MgO layer, the value of a must be replaced with the value (known in the art) corresponding to the material in question.

For the thicker layers, in particular the $MgF_2$ layer, a conventional thickness measurement was carried out using the Woolam VB-400 VASE ellipsometer (measurement at 3 angles of incidence: 65°, 70° and 75°).

The adjustment was carried out by varying the Cauchy parameters and the thickness. The starting point for the calculation was a (dependent on the material), b=0.003 and c=0 and an estimated value of the thickness (typically a=1.38 for $MgF_2$).

Deblocking (or Edging) Test

This test made it possible to score the ability of the ophthalmic lenses to pass with success an edging test.

Description of the test:

1) a 3M (double-sided adhesive) adhesive pad (24 mm-diameter 3M/Essilor pad, ref. GAM200) was adhesively bonded to the milling block (block of 24 mm diameter, ref. GAM202), the pad being placed centrally on the block;

2) the protective film was removed from the pad, care being taken not to touch the adhesive; 3) the block+pad assembly was adhesively bonded to the center of the convex surface of the lens tested; and 4) the lens was flipped: a ring of continuous adhesion must be obtained on the periphery of the pad. The existence of this ring guaranteed effective bonding of the pad to the lens.

A certain number of actions were then applied.

TABLE 1

| Action | Score |
|---|---|
| The block falls off under its own weight, no action needing to be applied. | 0 |
| The block debonds under the effect of a manual action (force) exerted laterally by index finger on the block, a fulcrum being obtained by thumb on the edge face of the lens. The force is exerted laterally, i.e. perpendicularly to the axis of the lens. During the above operation, the lens is kept immobile during the test. The lens is turned by 90° between each action (4 maximum). | Score comprised between 0.25 and 3<br>0.25: the block debonds after the 1st action<br>1: the block debonds after the 2nd action<br>2: the block debonds after the 3rd action<br>3: the block debonds after the 4th action |
| The adhesion ring is checked to see if it has degraded and needs to be reformed. | −0.25 to the final score |
| The action is applied manually by means of a pair of pliers that allow a force to be exerted along the optical axis of the lens, i.e. perpendicularly to the lens and in a direction opposite thereto. The block debonds during perpendicular actions applied with the pair of debonding pliers. | Score comprised between 3 and 4<br>3.25: the block debonds after the 1st action<br>3.5: the block debonds after the 2nd action<br>3.75: the block debonds after the 3rd action<br>4: the block debonds after the 4th action |
| The adhesion ring is checked to see if it has degraded and needs to be reformed. | −0.25 to the final score |
| The block debonds when subjected to manual circular (torsional) actions applied with the pair of debonding pliers. | Score comprised between 4 and 5<br>4.5: the block debonds easily<br>5: the block is difficult to debond |

The actions are progressive and must always be carried out in this order.

The final score is obtained after the various actions have been carried out and any "0.25 point" subtractions made.

By way of reference, the commercially available Crizal® Alizé® Essilor lens, comprising a top-coat for facilitating edging, obtains a score of 5/5 in the above test.

Once the score has been obtained, the results are grouped and reclassified:

5: +++
4 to less than 5: ++
3 to less than 4: +
2 to less than 3: −
less than 2: X (fail)

Test of Ease of Removal of the Top-Coat:

Score from 1 (very difficult) to 5 (easy).

The lens with its top-coat was held on its edge face between the thumb and index finger of one hand and the surface of the lens was wiped with a dry Selwith™ cloth, pressure being applied with the thumb of the other hand. (1 wipe corresponds to one pass).

After each pass, the color in reflection of the lens was checked visually under a neon light.

A reflection of a green color indicated that the top-coat had been removed.

While the reflection remained blue in color, the top-coat was still present or partially present.

The number of passes necessary for the top-coat to be removed was noted and a first score given.

1: very difficult (5 passes or more)
2: 4 passes
3: 3 passes (more difficult than the Crizal® Alizé® system)
4: 2 passes (a little more difficult than Azur)
5: 1 pass (the commercially available Crizal® Alizé® lens corresponds to this level)

Then a new classification was applied (per category)

Ease of removal

5: +++
4 to less than 5: ++
3 to less than 4: +
<3: X (fail)

Measurement of Static Contact Angle With Water

The static contact angle with water was measured after removal of the temporary layers ($MgF_2$/MgO).

The measurement was carried out by automatic acquisition and analysis of images of the contact angle of a water droplet deposited on the surface of a flat or curved glass, with the aim of evaluating the hydrophobic performance of a treatment.

The measurement was carried out in a Kruss DSA100 (drop shape analysis system) apparatus connected to a Windows PC.

The volume of the droplet formed was 4 microliters.

The conductivity of the water was comprised between 0.3 µS and 1 µS at 25° C.

The temperature of the room was kept at 23+/−5° C.

The results are given in table 2 below.

TABLE 2

| Example | DSX™ (Thickness in nm) | OF210™ (Thickness in nm) | $MgF_2$ (Thickness in nm) | Static contact angle with water (°) | De-blocking score | Ease of removal |
|---|---|---|---|---|---|---|
| Ex 1 | 9.6 | 5.2 | 35.7 | 118.7 | +++ | + |
| Ex 2 | 9.6 | 7.8 | 35.7 | 117.4 | +++ | + |
| Ex 3 | 6.2 | 6.5 | 35.7 | 117.2 | ++ | + |
| Ex 4 | 9.6 | 7.1 | 32.9 | 118.4 | ++ | + |
| Ex 5 | 9.6 | 6.5 | 35.7 | 118.1 | ++ | + |
| Ex 6 | 13.1 | 6.5 | 35.7 | 117.2 | ++ | + |
| Ex 7 | 11 | 6.2 | 32.9 | 117.2 | + | ++ |
| Ex 8 | 8.3 | 6.2 | 32.9 | 118 | + | + |
| Comp 1 | 13.1 | 5.2 | 52.5 | 118.1 | ++ | X |
| Comp 2 | 13.1 | 7.8 | 52.5 | 117.6 | + | X |
| Comp 3 | 13.1 | 7.8 | 18.9 | 118.6 | X | +++ |
| Comp 4 | 9.6 | 6.5 | 52.5 | 117.6 | − | X |
| Comp 5 | 9.6 | 0 | 38.7 | 113.5 | + | X |
| Comp 6 | 9.6 | 0 | 18.9 | 114.1 | ++ | ++ |

Comp: comparative

The examples according to the invention allowed a score + to be obtained in the unblocking test and a score of + to ++ in the ease of removal test, while at the same time having a static contact angle with water, measured after removal of the temporary layer, of at least 117°.

This contact-angle value represents a substantial improvement relative to contact angles obtained with an Optool DSX™ layer in comparative examples 5 and 6.

It will be noted, with regard to comparative example 3, that an MgF$_2$ thickness of 18.9 nm leads to a fail in the deblocking test and that an increase to 52.5 nm in the thickness of the layer of MgF$_2$ (comparative example 4), surprisingly, does not allow both the required adhesion level and the required wiping resistance to be obtained, the latter property being very important for the final user.

It would appear that the effects of the invention are obtained at specific Optool DSX™, OF210™ and MgF$_2$ thickness values.

The invention claimed is:

1. An ophthalmic lens fit for edging, comprising a front main face and a back main face, wherein it is obtained by depositing in succession in this order on at least one of the main faces of the lens and preferably the front main face:
    at least one first hydrophobic layer, of a physical thickness of 6 to 16 nm, obtained by depositing a composition comprising a constituent A chosen from fluorinated compounds and preferably perfluorinated compounds containing at least one silanol group or a silanol-group precursor, and the number average molar mass of which is higher than or equal to 2000 g/mol and preferably 2000 to 10000 g/mol;
    at least one second hydrophobic layer, of a physical thickness ranging from 3 to 20 nm, obtained by depositing a composition comprising a constituent B chosen from fluorinated compounds and preferably perfluorinated compounds containing at least one silanol group or a precursor thereof and the number average molar mass of which is lower than or equal to 900 g/mol;
    at least one temporary layer comprising a metal fluoride, preferably magnesium fluoride, of a physical thickness of 22 to 50 nm; and
    optionally a temporary layer comprising a metalloid or metal hydroxide and/or oxide.

2. The ophthalmic lens of claim 1, wherein the physical thickness of the second hydrophobic layer is from 3 to 10 nm.

3. The ophthalmic lens of claim 2, wherein the physical thickness of the second hydrophobic layer is from 5 to 8 nm.

4. The ophthalmic lens of claim 1, wherein the physical thickness of said first hydrophobic layer is from 6 to 15 nm, and the physical thickness of said layer comprising a metal fluoride is from 24 to 40 nm.

5. The ophthalmic lens of claim 1, wherein the physical thickness of said first hydrophobic layer is from 8 to 12 nm, and the physical thickness of said layer comprising a metal fluoride is from 25 to 38 nm.

6. The ophthalmic lens of claim 1, wherein the total thickness of the first hydrophobic layer and the second hydrophobic layer is larger than or equal to 13 nm.

7. The ophthalmic lens of claim 1, wherein the total thickness of the first hydrophobic layer and the second hydrophobic layer is larger than or equal to 15 nm when the thickness of the temporary layer comprising a metal fluoride is larger than or equal to 40 nm.

8. The ophthalmic lens of claim 1, wherein the metal fluoride is a magnesium fluoride.

9. The ophthalmic lens of claim 1, wherein it furthermore comprises a layer comprising a metalloid or metal hydroxide and/or oxide deposited on said layer comprising a metal fluoride and in that said metalloid or metal hydroxide and/or oxide is magnesium oxide.

10. The ophthalmic lens of claim 1, wherein the constituent A possesses a number average molar mass from 3000 to 6000 g/mol and better still from 3000 to 5000 g/mol.

11. The ophthalmic lens of claim 1, wherein the constituent B possesses a number average molar mass from 300 to 800 g/mol and better still from 400 to 600 g/mol.

12. The ophthalmic lens of claim 1, wherein only one chain end of the compound A comprises a silanol group or a silanol-group precursor.

13. The ophthalmic lens of claim 1, wherein only one chain end of the compound B comprises a silanol group or a silanol-group precursor.

14. The ophthalmic lens of claim 1, wherein the constituent A comprises a compound of formula:

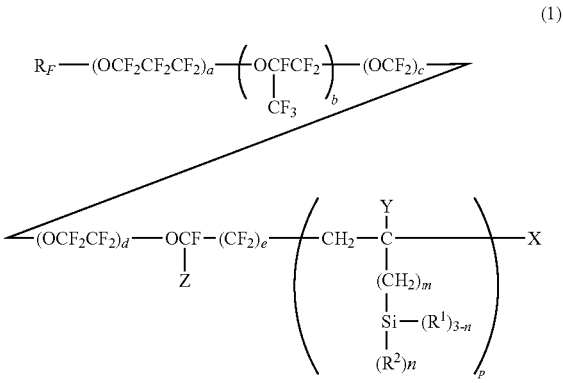

in which
R$_F$ represents a straight or branched perfluoroalkyl chain group containing 1 to 16 carbon atoms;
X is a hydrogen, bromine or iodine atom;
Y is a hydrogen atom or a linear or branched alkyl group containing 1 to 6 carbon atoms;
Z is a fluorine atom or a trifluoromethyl group;
R$^1$ is a hydrolysable group;
R$^2$ is a hydrogen atom or an inactive monovalent group;
a, b, c and d are integers from 0 to 200;
e is 0 or 1;
m and n are integers from 0 to 2; and
p is an integer from 1 to 10;
Rf, a, b, c, e, m, n and p are chosen so that the average molar mass of the compound of formula (1) is higher than or equal to 2000 g/mol.

15. The ophthalmic lens of claim 14, wherein the first hydrophobic layer is obtained by depositing a composition comprising from 35 to 60 wt % of a compound of formula (1) and better still 40 to 55 wt % of a compound of formula (1).

16. The ophthalmic lens of claim 1, wherein the first hydrophobic layer is obtained by depositing a composition comprising at least 40 wt %, better still at least 50 wt %, even better still at least 70 wt % and optimally at least 80 wt % of constituent A.

17. The ophthalmic lens of claim 1, wherein the two hydrophobic layers are deposited by evaporation.

* * * * *